United States Patent [19]

Hagio

[11] Patent Number: 5,561,846
[45] Date of Patent: Oct. 1, 1996

[54] BASE STATION AND CHANNEL MONITORING METHOD

[75] Inventor: Minoru Hagio, Fukuoka, Japan

[73] Assignee: Matsushita Electric Industrial Co., Ltd., Osaka, Japan

[21] Appl. No.: 231,670

[22] Filed: Apr. 25, 1994

[30] Foreign Application Priority Data

Apr. 30, 1993 [JP] Japan ................ 5-104441

[51] Int. Cl.⁶ ................ H04Q 7/00; H04Q 9/00
[52] U.S. Cl. ................ 455/34.1; 455/34.1; 370/95.1
[58] Field of Search ................ 455/33.1, 34.1, 455/34.2, 54.1, 56.1, 158.1, 151.1, 179.1, 62, 67.1, 33.2; 370/95.1, 95.3, 13, 17

[56] References Cited

U.S. PATENT DOCUMENTS

| | | | |
|---|---|---|---|
| 4,146,839 | 3/1979 | Troy | 455/62 |
| 4,914,649 | 4/1990 | Schwendeman et al. | 370/50 |
| 5,199,031 | 3/1993 | Dahlin | 370/110.1 |
| 5,235,598 | 8/1993 | Sasuta | 370/110.1 |
| 5,239,678 | 8/1993 | Grube et al. | 455/34.1 |
| 5,420,864 | 5/1995 | Dahlin et al. | 370/95.3 |
| 5,448,751 | 9/1995 | Takenaka et al. | 455/62 |

Primary Examiner—Reinhard J. Eisenzopf
Assistant Examiner—Gertrude Arthur
Attorney, Agent, or Firm—Watson Cole Stevens Davis, P.L.L.C.

[57] ABSTRACT

A channel monitoring method and a base station for use in carrying out the method are employed in a mobile communication system operating according to time-division multiple access and including a mobile switching controller for controlling radio channels in a plurality of radio zones; a plurality of base stations connected to the mobile switching controller by wires for forming the radio zones, respectively; and a plurality of mobile units for communicating with the base stations through radio channels. The channel monitoring method is characterized by, in the mobile communication system, assigning control channels of the respective base stations to one and the same slot and moving a traffic channel to the slot for the control channels for monitoring the traffic channel. Also, the base station in the mobile communication system is characterized by having a channel controller for assigning control channels of the respective base stations to one and the same slot, specifying the slot for control channels to a slot for monitoring a traffic channel, and switching a traffic channel to a control channel; and a slot synchronization unit for establishing slot synchronization among the respective base stations.

5 Claims, 7 Drawing Sheets

| | SLOT 1 | SLOT 2 | SLOT 3 | SLOT 4 |
|---|---|---|---|---|
| BASE STATION 2 | CCH | TCH 7 | EMPTY | TCH |
| BASE STATION 3 | CCH | EMPTY | TCH | EMPTY |
| BASE STATION 4 | CCH | TCH | EMPTY | TCH |
| BASE STATION 5 | CCH | TCH | TCH | EMPTY |

FRAME

FIG. 3B

| | SLOT 1 | SLOT 2 | SLOT 3 | SLOT 4 |
|---|---|---|---|---|
| BASE STATION 2 | TCH | EMPTY | EMPTY | TCH |
| BASE STATION 3 | MONITORING | EMPTY | TCH | EMPTY |
| BASE STATION 4 | MONITORING | TCH | EMPTY | TCH |
| BASE STATION 5 | MONITORING | TCH | TCH | EMPTY |

FRAME

BASE STATION AND CHANNEL MONITORING METHOD

BACKGROUND OF THE INVENTION

1. Field of the Invention

The present invention relates to a base station and a method of monitoring channels, executed when a radio zone is switched to another, in a mobile communication system according to a time-division multiple access (TDMA), wherein a plurality of radio zones are formed by a plurality of base stations so that a plurality of mobile units communicate with each other.

1. Description of the Related Art

In recent years, mobile communications have been remarkably spread. In addition, similar to ordinary point-to-point communications, onrush of digitization has been pressing on in the world of mobile communications. The digital system can not only increase the amount of communications by leaps and bounds but also provide high quality communications and good protection against eavesdropping. In order to correspond to increasing communication demands under such background, the development of digital mobile communication systems has been actively progressed instead of conventional analog systems. Particularly, mobile communication systems according to the time-division multiple access are approaching to practical use. The time-division multiple access is an access method which multiplexes a plurality of communication paths on the time base. The time-division multiple access can simplify the system configuration and enhance system functions by utilizing idle time during communications. When the time-division multiple access is employed in combination with a multi-zone mode which divides a wide service area into a plurality of small radio zones for radio communications, a resulting communication system will achieve efficient utilization of frequencies and high cost effectiveness, so that such a system will be greatly expected as a mobile communication system. A conventional channel monitoring method, executed when switching a zone to another, in mobile communication systems according to the time-division multiple access, and a base station associated therewith will be explained below with reference to the accompanying drawings.

Figure 5:
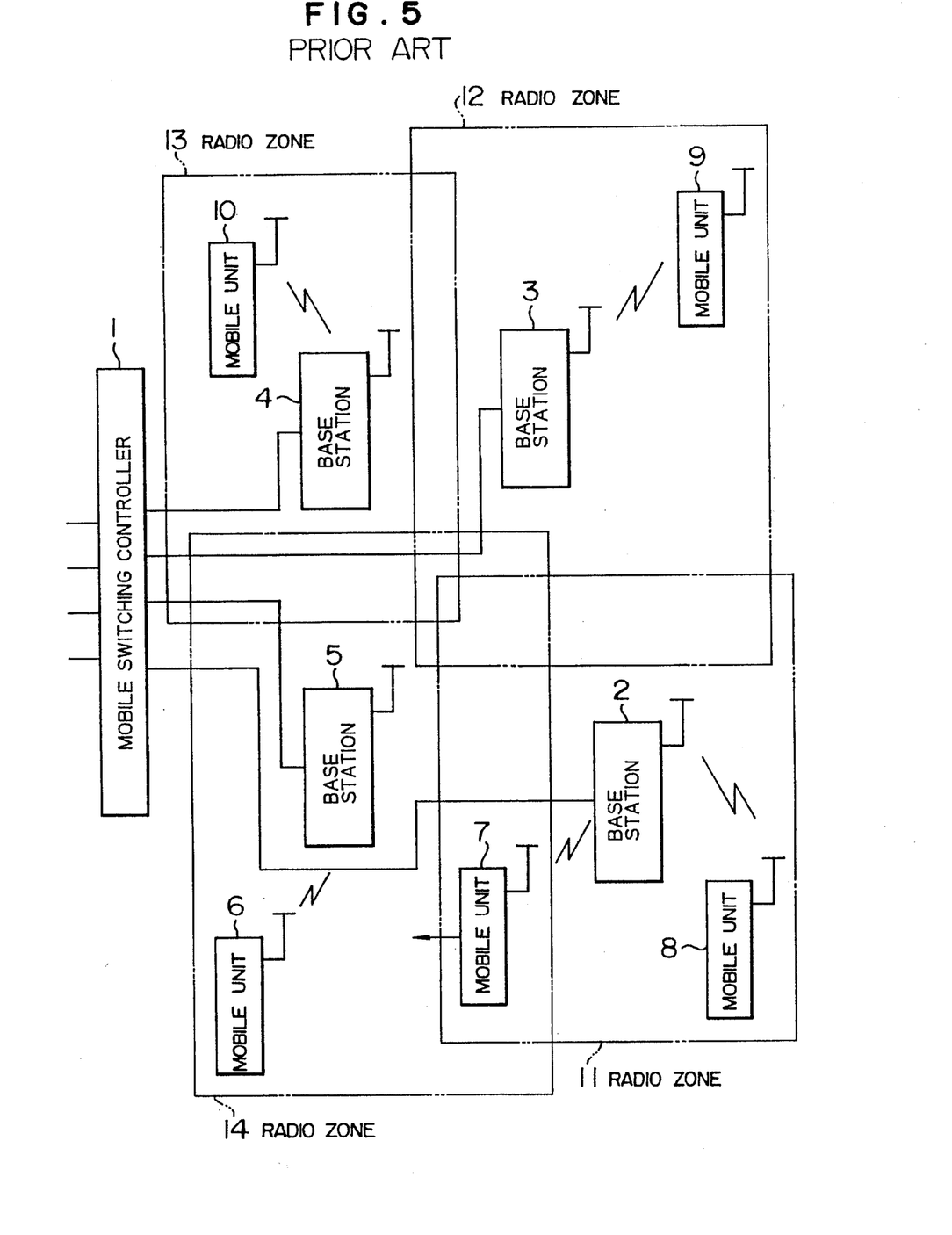
FIG. 5 shows in a block diagram form the configuration of a mobile communication system according to the time-division multiple access.

FIG. 5 is a block diagram showing the configuration of a mobile communication system according to the time-division multiple access. In FIG. 5, reference numeral 1 designates a mobile switching controller for controlling exchanges between an ordinary public network or other mobile communication systems and a radio channel within the mobile communication system itself and for managing travelling of mobile units, including registration of positions and so on, and radio communications of the mobile communication system; 2–5 base stations each for setting and resetting a radio channel, through which communications are performed with a mobile unit, under the management of the mobile switching controller 1 and for monitoring radio channels; 6–10 mobile units each for performing communications through the base stations 2–5 and the mobile switching controller 1 while moving within the system. The mobile unit may be a portable telephone, a portable terminal and so on, represented by a personal hand-held telephone. In this mobile communication system, radio zones 11–14 are defined for the base stations 2–5, respectively.

Figure 6:
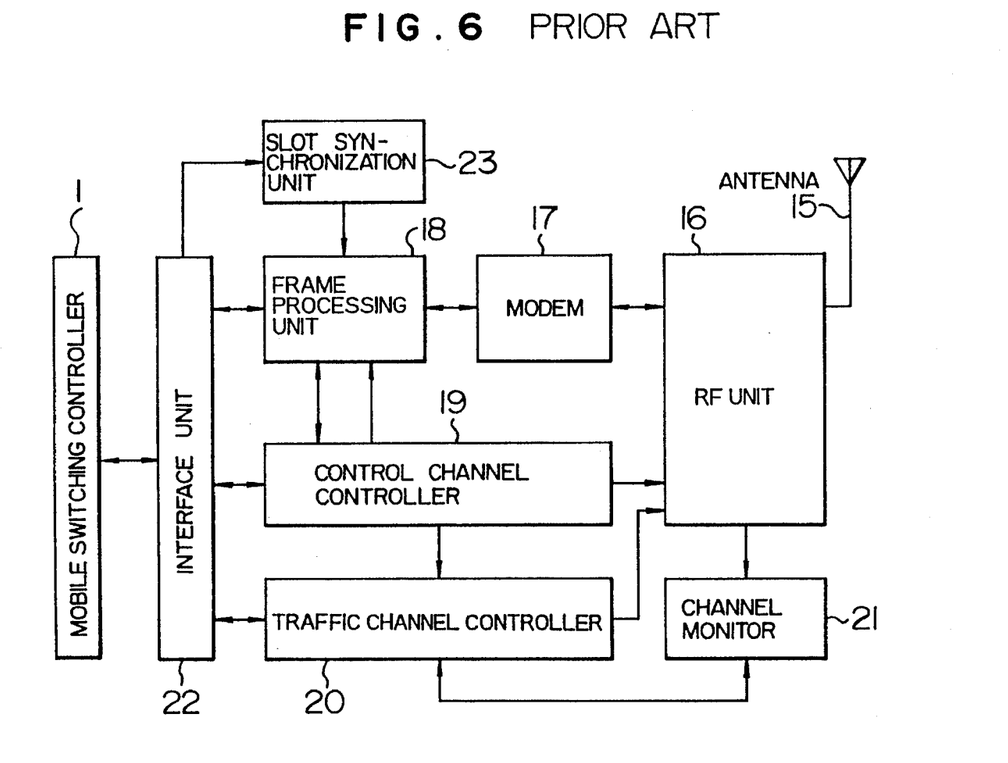
FIG. 6 shows in a block diagram form the configuration of a conventional base station.

Next, FIG. 6 shows the configuration of a conventional base station. In FIG. 6, reference numeral 15 designates an antenna for transmitting and receiving radio signals from and to a mobile unit (not shown); 16 an RF unit for subjecting received radio signals to frequency conversion, amplification, and so on and outputting the processed signal to a subsequent modem 17, later described, or conversely for converting modulated signals inputted thereto from the modem 17 to radio signals; 17 the modem for demodulating modulated signals to produce baseband signals and conversely for generating modulated signals from baseband signals; 18 a frame processing unit for compressing and expanding baseband signals on the time base to generate and decompose time-division multiple access (TDMA) signals and for generating and decomposing frames; 19 a control channel controller for controlling the assignment of radio frequencies and transmission timing to a control channel; 20 a traffic channel controller for controlling the assignment of radio frequencies and slots and so on for traffic channels; 21 a channel monitor for monitoring channels, later described in detail; 22 an interface unit for interfacing data transmission between the mobile switching controller 1 and the base stations 2–5 shown in FIG. 5; and 23 a slot synchronization unit for extracting a slot synchronization signal from a signal from the mobile switching controller 1 received by the interface unit 22 and controlling a slot timing of the frame processing unit 18 in order to establish the synchronization among the base stations 2–5 at the timing of the extracted slot synchronization signal.

Explanation will be next given of the operation of the base station configured as shown in FIG. 6 when used as the base stations 2–5 shown in FIG. 5. Prior to starting communications, the base stations 2–5 each need to set a control channel. Upon turning on the power supply, the control channel controller 19 in each of the base stations 2–5 specifies a slot for a control channel for the frame processing unit 18 which has previously been determined, and transmits control data necessary for communications. The control data transmitted from the mobile switching controller 1 is converted by the frame processing unit 18 to data in a previously determined frame format, placed in the specified slot, and supplied to the modem 17. This signal is modulated by the modem 17, and supplied to the radio frequency (RF) unit 16 which conducts frequency-conversion and amplification on the modulated signal to produce a radio signal. The frequency of the radio signal thus produced is specified by the control channel controller 19. The radio signal is then sent from the antenna 15. The control channel, once starting the transmission, continues the transmission with the same slot.

Figure 9:
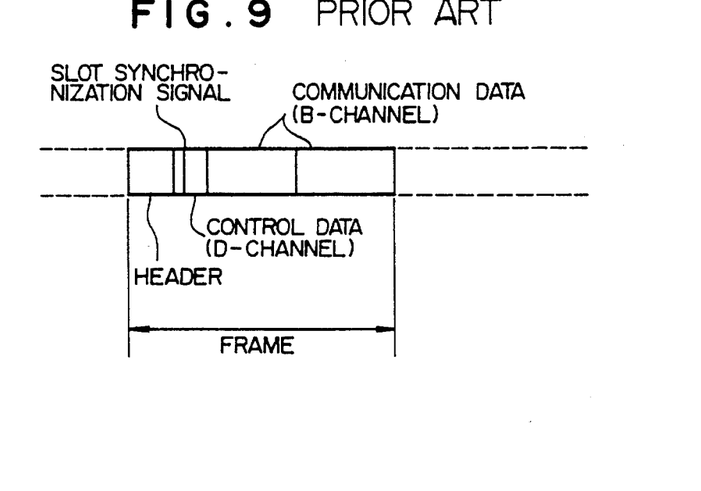
FIG. 9 is an explanatory diagram showing an example of a data transmission format for data transmitted between a mobile switching controller and a base station.

The interface unit 22 receives and transmits communication data and control data from and to the mobile switching controller 1. Between the mobile switching controller 1 and the base stations 2–5, the control data is transmitted through a D-channel while the communication data through a B-channel. This data transmission will be explained with reference to a data format shown FIG. 9. It should be noted however that the data format of FIG. 9 is merely illustrative. The data transmission between the mobile switching controller 1 and the base stations 2–5 is performed in frame units. Each frame is composed of a header, a slot synchronization signal, the D-channel and the B-channel. The slot synchronization signal is used to establish the synchronization of the respective base stations 2–5 when data is transmitted from the mobile switching controller 1 to the base stations 2–5. The slot synchronization unit 23 extracts a change in the slot synchronization signal in the frame and generates a timing signal indicating the timing at which the frame processing unit 18 generates a TDMA signal. This enables slots assigned to the respective base stations 2–5 to be synchronized with each other.

Next, the configuration of the mobile units 6–10, communicating with the base stations 2–5, will be briefly explained, though not referring to drawings. Each of the mobile units 6–10 has an antenna; an RF unit; a modem; a frame processing unit; a control channel controller for controlling these components; and a traffic channel controller, similar to the base stations 2–5. When the mobile units 6–10 are portable telephones, they additionally comprise a microphone, a speaker and so on. The operations of the antenna, RF unit, frame processing unit, control channel controller, and traffic channel controller of each mobile unit are basically identical to those of the correspondents in the base stations 2–5. However, the base station differs from the mobile unit in that the former starts data transmission upon turning on the power supply, while the latter starts data reception, and in that the former has the right of determining a frequency and a slot to be used, while the latter is not allowed to determine these parameters.

The mobile units 6–10, when transmitting control data to the base stations 2–5, do so in conformity to the transmission timings of control channels from the respective base stations 2–5. More specifically, since control channels from the base stations 2–5 to the mobile units 6–10 and control channels from the mobile units 6–10 to the base stations 2–5 have transmission timings thereof which are defined according to the method such as the time-division multiple access (TDMA) or time-division multiple access time-division duplex (TDMA-TDD) or the like, the mobile units 6–10 can know their transmission timings of the control channels to the base stations 2–5 by receiving the control data from the base stations 2–5. In each of the base stations 2–5, the control data is received through the antenna 15, subjected to radio-frequency conversion in the RF unit 16, demodulated to a baseband signal by the modem 17, and inputted to the control channel controller 19 through the frame processing unit 18. Thus, the control channel controller 19 operates in accordance with the contents of the control data.

When the control channels have been set in this manner, the base stations 2–5 are enabled to communicate with the mobile units 6–10. The procedure of the communications will be explained below. First, for starting the communications, the traffic channel controller 20 in each of the base stations 2–5 specifies a slot for a traffic channel to the frame processing unit 18 and a frequency of radio signals to the RF unit 16. Assuming that the communications are made from the base stations 2–5 to the mobile units 6–10, communication data as shown in FIG. 9, transmitted from the mobile switching controller 1 through the B-channel, is extracted by the interface unit 22, and converted to a signal in a predetermined frame format by the frame processing unit 18. Then, the formatted signal is placed in a predetermined slot specified by the traffic channel controller 20 and inputted to the modem 17 in which the formatted signal is modulated. This modulated signal is converted to a radio signal at the frequency specified by the traffic channel controller 20 in the RF unit 16 and then transmitted through the antenna 15. The transmission in the reverse direction from the mobile units 6–10 to the base stations 2–5 is also performed basically in a similar manner. Specifically, communication data from each mobile unit 6–10 is transmitted after it has been processed to be a radio signal in the RF unit, and received by the antenna 15 of each base stations 2–5. This radio signal is subjected to frequency conversion and amplification to be a modulated signal in the RF unit 16 under the control of the traffic channel controller 20. The modulated signal is then supplied to the modem 17 and demodulated thereby to be a baseband signal. The baseband signal is decomposed by the frame processing unit 18 to produce a data signal which is transmitted to the mobile switching controller 1. The data signal is further formatted in the frame as shown in FIG. 9 by the interface unit 22 and inputted to the mobile switching controller 1.

Incidentally, when one of the mobile units 6–10 moves from a radio zone 11–14 to another radio zone 11–14, radio channel monitoring is performed. In this event, the mobile switching controller 1 first transmits a channel monitor request signal which is inputted to the traffic channel controller 20 through the interface unit 22. This channel monitor is performed in order to measure the level of a received radio signal at the time the channel monitor is requested, with specified radio frequency and slot. At this time, a slot and a radio frequency for monitoring a received radio signal are specified to the base stations 2–5 by the mobile switching controller 1. The traffic channel controller 20, upon receiving the channel monitor request signal, instructs the channel monitor 21 to monitor a channel with the specified slot and radio frequency. The channel monitor 21, after monitoring the channel, informs the traffic channel controller 20 of the measurement result. The traffic channel controller 20 further transmits this measurement result to the mobile switching controller 1 through the interface unit 22. Incidentally, if a specified slot for a channel to be monitored is being used when a channel monitor is requested, another slot must be specified for monitoring the channel in place of the previously specified slot. In this event, the mobile switching controller 1 instructs the base stations 2–5 to switch the previously specified slot to another. This instruction is inputted to the traffic channel controller 20 through the interface unit 22 in each of the respective base stations 2–5. The traffic channel controller 20 instructs the mobile units 6–10 under communication to switch the previously specified slot to another through a traffic channel and thereafter carries out the slot switching.

Figure 10:
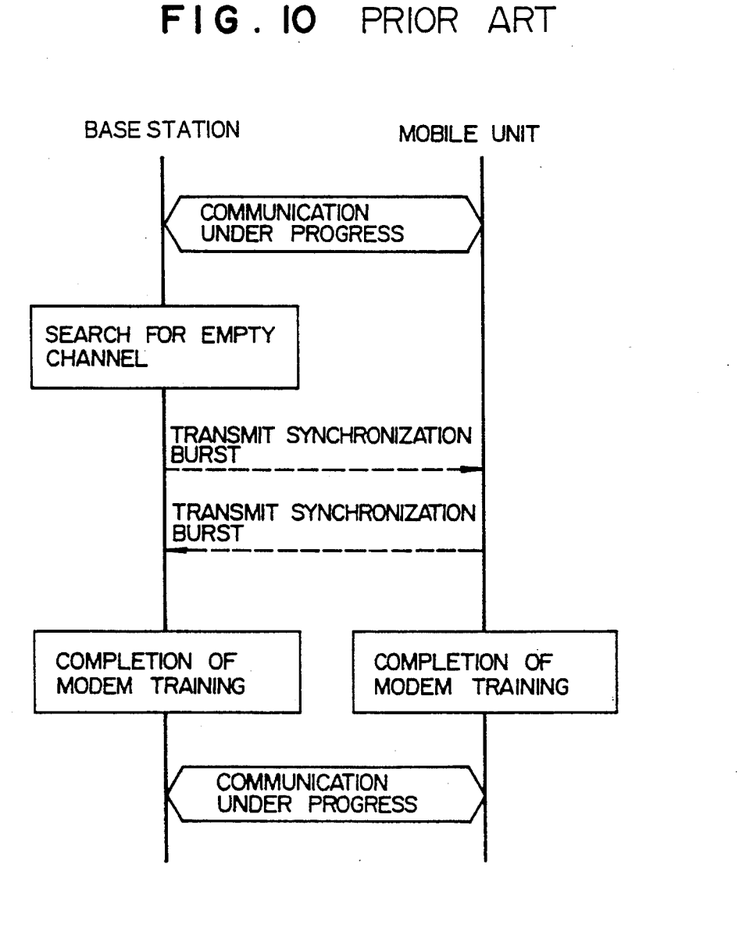
FIG. 10 is a sequence chart representing a sequence of slot switching operations.

How to carry out this slot switching will be explained along a sequence of operations associated therewith, illustrated in FIG. 10. For the slot switching, the traffic channel controller 20 in each of the base stations 2–5 needs to control the channel monitor 21 to search for an empty channel (a radio frequency and a slot). When an empty channel has been found, the traffic channel controller 20 utilizes a traffic channel to inform the mobile units 6–10 of the channel to be switched which was found as a result of the search. The transmission of information indicative of the channel to be switched by use of the traffic channel is performed, in the case of audio communications, such that audio signals are not transmitted, for example, for one frame period, and the information indicative of the channel to be switched is transmitted instead of the audio signals. In this event, since only one frame of the audio signals is dropped, deterioration of the audio quality is not perceived by the mobile units 6–10. It is therefore possible to transmit channel switching information while maintaining a call. The base stations 2–5 and the mobile units 6–10, after transmitting the channel switching information, each transmit a synchronization burst as well as try to establish the synchronization with the synchronization burst from the opposite party. Here, the synchronization burst is a training radio signal for the modems 17 in the base stations 2–5 and for modems in the mobile units 6–10 to operate correctly, and is not used to carry information to be transmitted. The synchronization bursts are communicated by use of a radio frequency and a slot to be switched. After the synchronization has been established to enable radio transmission, the radio frequency and the slot used for transmitting the synchronization burst is again assigned to a normal traffic channel, thus completing the slot switching.

However, since each of the conventional base stations has the separate traffic channel controller 20 and control channel controller 19 operating independently of each other, they are not allowed to switch a slot for a control channel to a slot for a traffic channel, and troublesome switching operations must be performed for the slot switching.

Figure 7:
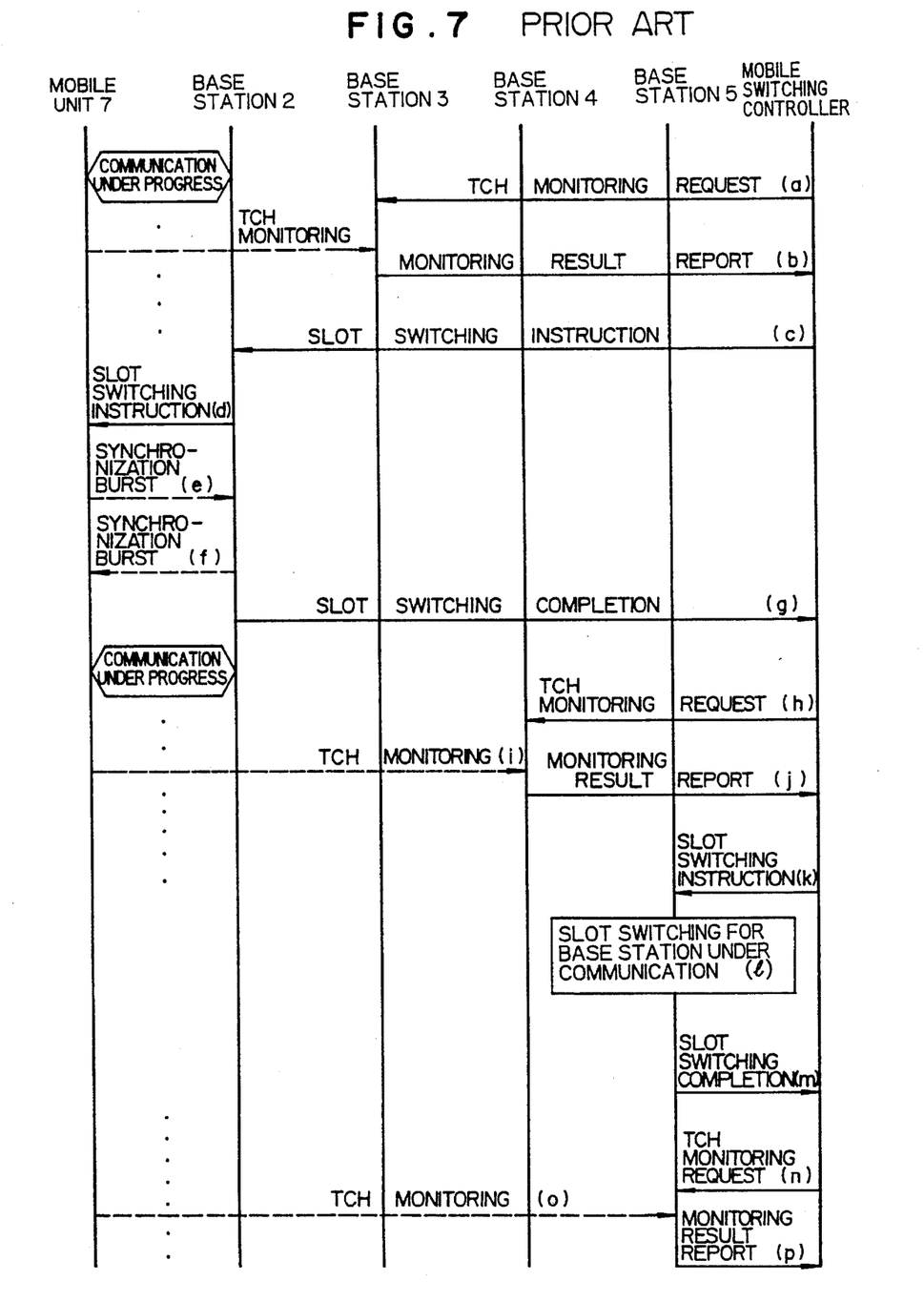
FIG. 7 is a sequence chart representing traffic channel monitoring performed in accordance with a conventional method.
Figure 8:
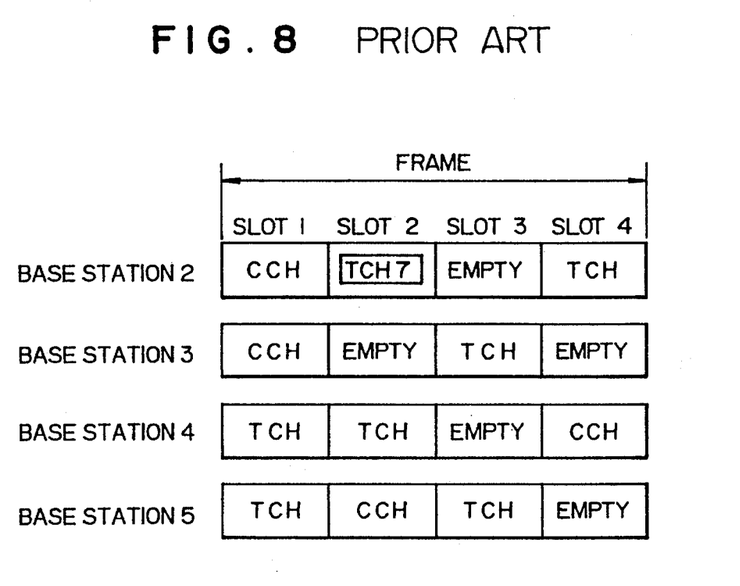
FIG. 8 is an explanatory diagram showing an example of how channels are used by respective base stations.

For better understanding, referring to FIGS. 7 and 8, explanation is given of how traffic channel monitoring is troublesome, when performed by use of the conventional base stations configured as described above. FIG. 7 shows a sequence chart of the traffic channel monitoring in accordance with a prior art method, and FIG. 8 shows an example of channels used by the respective base stations 2–5. More specifically, shown in FIGS. 7 and 8 are frames transmitted from the mobile units 6–10 to the base stations 2–5, where the traffic channel is abbreviated as TCH and the control channel as CCH. For simplifying the explanation, it is assumed herein that the mobile unit 7 is moving from the radio zone 11 to the radio zone 14 as shown in FIG. 5, and explanation will be given of traffic channel monitoring requested by the mobile unit 7 in association with this zone switching.

It should be noted that while a four-division multiple access is illustrated in FIG. 8, the following explanation does not depend on the number of multiplexed channels and is applicable to the time-division multiple access time-division duplex (TDMA-TDD) method. This mode enables bi-directional communications of frames from the mobile units 6–10 to the base stations 2–5 and, conversely, frames from the base stations 2–5 to the mobile units 6–10, wherein data to be transmitted is treated as a single frame. A traffic channel used by the mobile unit 7 is designated "TCH7"in FIG. 8. It is also assumed that the mobile switching controller 1 has already detected that zone switching is required to the mobile unit 7.

Referring first Co FIG. 7, channel monitoring is mainly led by the mobile switching controller 1. Since the mobile switching controller 1 manages radio communications performed by the base stations 2–5, the mobile switching controller 1 is aware of which slot is being used by which of the base stations 2–5. For this reason, the mobile switching controller 1 first requests TCH monitoring (a) to the base station 3 which is not using the same slot as that for the traffic channel of the mobile unit 7. The base station 3, upon receiving the TCH monitoring request (a), monitors the traffic channel of the mobile unit 7 and transmits the monitoring result report (b) to the mobile switching controller 1.

The mobile switching controller 1 next sends a slot switching instruction (c) to the base station 2 to instruct the base station 2 to switch the slot for the traffic channel between the mobile unit 7 and the base station 2. The base station 2, upon receiving the slot switching instruction (c), sends a slot switching instruction (d) to the mobile unit 7. This slot switching is carried out by the previously explained procedure. Specifically, the synchronization burst is transmitted (e) and received (f) between the base station 2 and the mobile unit 7 before the slot switching is performed. When the slot switching is completed, the base station 2 sends information indicating that the slot switching has been completed (g) to the mobile switching controller 1.

Subsequently, the mobile switching controller 1 sends a TCH monitoring request (h) to the base station 4 which is not using the same slot as that for the new traffic channel of the mobile unit 7. The base station 4, upon receiving the TCH monitoring request (h), monitors the traffic channel of the mobile unit 7 (i), and sends a monitoring result report (j) to the mobile switching controller 1.

The mobile switching controller 1 next issues a slot switching instruction (k) to the base station 5 in order to enable the base station 5 to monitor the traffic channel of the mobile unit 7, and performs slot switching (1) such that the same slot as that for the traffic channel of the mobile unit 7 becomes empty. This switching is done in order to enable radio signals transmitted from the mobile unit 7 to be monitored by using an empty slot while the base station 5 continues a call. After the slot switching is completed, the base station 5 transmits information indicating that the slot switching has been completed (m) to the mobile switching controller 1. Afterward, the mobile switching controller 1 transmits a TCH monitoring request (n) to the base station 5. The base station 5, upon receiving the TCH monitoring request (n), monitors the traffic channel of the mobile unit 7 (o) and transmits a monitoring result report (p) to the mobile switching controller 1. Thus, a sequence of TCH monitoring operations are completed, with the result that the mobile switching controller 1 selects one of the base stations 2–5 which is in the best receiving condition to determine a radio zone to be switched.

SUMMARY OF THE INVENTION

The conventional channel monitoring method as described above, however, needs to perform the slot switching in accordance with the positional relations between traffic channels of the mobile unit 6–10 desired to be monitored and empty slots of the base stations 2–5. This slot switching implies troublesome and complicated procedures, therefore, a channel monitoring time is longer and load on the mobile switching controller 1 is increased.

To avoid the problems mentioned above, it may be thought to restrict the base stations 2–5 that are permitted to monitor channels of the mobile units 6–10, for example, permitting the base stations 2–5 having an empty slot at the same position as the traffic channel of the mobile unit 7 to perform the channel monitoring. However, it can be thought that such restrictions may result in finding none of the base stations 2–5 suitable for zone switching. Another possible problem incurred by the restrictions is that the base stations 2–5 having all slot occupied cannot perform the channel monitoring.

To solve the above problems, the present invention provides a channel monitoring method for use in a mobile communication system according to the time-division multiple access including a mobile switching controller for controlling radio channels in a plurality of radio zones, a plurality of base stations connected to the mobile switching controller by wires, each for forming one of the radio zones, and a plurality of mobile units for communicating with the base stations through radio channels, which is characterized by assigning control channels of the respective base stations to one and the same slot; and moving a traffic channel to be monitored to the slot to which the control channels have been assigned, for monitoring the traffic channel.

Preferably, the control channel is used to intermittently transmit control data so that the traffic channel, when monitored, is moved to the slot to which the control channels have been assigned only at intervals during which no control data is transmitted therethrough.

The present invention also provides another channel monitoring method for use in a mobile communication system according to a time-division multiple access including a mobile switching controller for controlling radio channels in a plurality of radio zones, a plurality of base stations connected to the mobile switching controller by wires, each for forming one of the radio zones, and a plurality of mobile units for communicating with the base stations through radio channels, which is characterized by previously assigning control channels of the respective base stations to one and the same slot; immediately monitoring a traffic channel when a slot for the traffic channel under communication is empty in all the other base stations; and if any of the other base stations is using the same slot as that for a traffic channel under communication, moving the traffic channel to the slot to which the control channels have been assigned, and then monitoring the traffic channel.

The present invention further provides a base station in a mobile communication system according to a time-division multiple access, including a mobile switching controller for controlling radio channels in a plurality of radio zones, and a plurality of mobile units for communicating with the base station through radio channels, wherein a plurality of the base stations, each forming one of the radio zones, are connected to the mobile switching controller by wires, the base station being characterized by a channel controller for assigning control channels of the respective base stations to one and the same slot, specifying a slot for control channels to a slot for monitoring a channel, and switching a traffic channel to the control channel; and a slot synchronization unit for establishing slot synchronization among the respective base stations.

A channel controller suitable to the above mentioned is one which is capable of controlling intermittent transmission timing of the control channel.

The channel monitoring method of the present invention assigns control channels of the respective base stations to one and the same slot and moves a traffic channel to be monitored to the slot assigned to the control channels of the base stations, so that the respective base stations can monitor the traffic channel through the control channels. In this manner, all the base stations can simultaneously monitor the traffic channel in a short time. If a control channel is used to intermittently transmit control data so that a traffic channel to be monitored is moved to the control channel only at intervals during which no control data is transmitted, the traffic channel can be monitored without stopping the transmission of control data through the control channel, whereby the channel monitoring is carried out without dropping any control data from the base stations. Further, if a slot assigned to a traffic channel under communication is empty in all the other base stations, the traffic channel is immediately monitored. If any base station is using the same slot as that for the traffic channel under communication, the traffic channel is moved to the slot for the control channels. In this manner, the channel monitoring can be rapidly carried out because the slot switching is no longer required when an empty slot is available to all the base stations.

The base station of the present invention has the channel controller which is capable of specifying a slot for control channels and switching a traffic channel to the slot for control channels, so that control channels of the respective base stations are assigned to one and the same slot, and a traffic channel is moved to the slot for the control channels when the traffic channel is to be monitored, whereby the base stations can simultaneously monitor the traffic channel in a short time.

DESCRIPTION OF THE PREFERRED EMBODIMENTS

Figure 1:
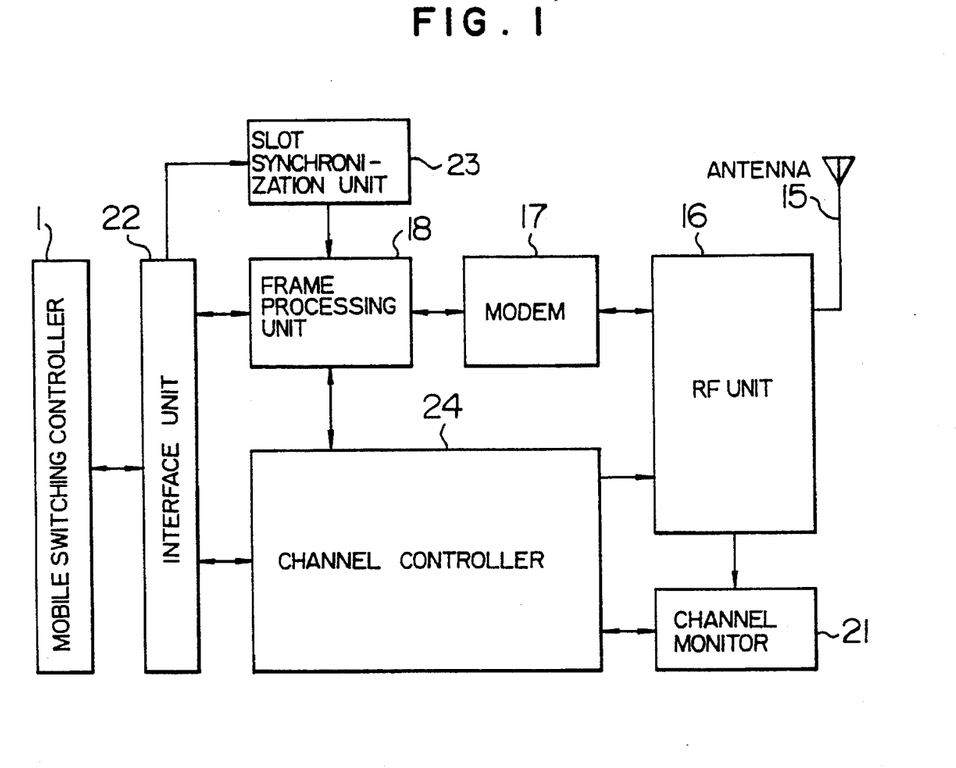
FIG. 1 shows in a block diagram form the configuration of a base station which implements the method of the present invention.

FIG. 1 shows the configuration of a base station which implements the present invention, and is used in a mobile communication system according to the time-division multiple access as shown in FIG. 5. Functional blocks in FIG. 1 identical to those in FIG. 6 are designated the same reference numerals, with intent to mean that the functions are basically the same in both drawings. In FIG. 1, a channel controller 24 is newly provided for specifying a slot for control channels as a slot for monitoring a channel and for switching a traffic channel to this control channel.

Now, explanation will be given of the communication operation of the base station configured as described above. Prior to starting communications, a control channel must be set. Upon turning on the power supply, the channel controller 24 specifies a slot for a control channel to a frame processing unit 18, in accordance with control data supplied from the mobile switching controller 1 through a D-channel, to have the mobile switching controller 1 send control data necessary for communications through the control channel. The slot is specified in the following manner. Information on a slot to be used, carried by the D-channel for control data shown in FIG. 9, is transmitted from the mobile switching controller 1 to an interface unit 22 through wires, extracted by the interface unit 22, and then supplied to the channel controller 24. The channel controller 24 controls operation timing of the frame processing unit 18 in accordance with the slot information. As a result, a slot is specified.

While a slot for a control channel cannot conventionally be specified for monitoring a channel, the present invention, utilizing the channel controller 24 to manage both control and traffic channels, permits a slot for control channel to be specified for monitoring a traffic channel. The control data, after being converted into a signal in a predetermined format by the frame processing unit 18, is placed in a specified slot. This formatted signal is then modulated by a modem 17 to be a modulated signal which is next subjected to frequency-conversion and amplification by an RF unit 16, thus producing a radio signal. The frequency of this radio signal is specified by the channel controller 24. The radio signal is transmitted from an antenna 15.

The interface unit 22 transmits and receives communication data and control data formatted in a data structure as shown in FIG. 9 to and from the mobile switching controller I. A signal from the mobile switching controller 1 has a slot synchronization signal inserted therein, which becomes active cyclically. A slot synchronization unit 25 extracts this slot synchronization signal for controlling the timing at which the frame processing unit 18 generates a TDMA signal. As a result, respective base stations 2–5 can synchronize their slots with each other.

The operation of the base station configured as shown in FIG. 1 will be explained for the case where it is used as the base stations 2–5 in FIG. 5.

Each of the mobile units 6–10 in FIG. 5 has an antenna, an RF unit, a modem, a frame processing unit, and a channel controller for controlling these components. The mobile unit also has a microphone, a speaker and so on in addition to the above-mentioned components, when it is a portable telephone. These components act similarly to their correspondents in each of the base stations 2–5. It should be noted however that the mobile units 6–10, even if they are conventional ones, are capable of transmitting and receiving data to and from the base stations 2–5 of the present invention.

When the base stations 2–5 send control data through control channels, the mobile units 6–10 send control data to the base stations 2–5 in conformity to the transmission timings of the control channels from the base stations 2–5, as has been described above. The control data is received by the antenna 15, subjected to radio frequency conversion in the radio processing unit 16, and inputted to the channel controller 24 through the modem 17 and the frame processing unit 18 in each of the base stations 2–5. The channel controller 24 is operated in accordance with the contents of the received control data.

When the control channels have been set in this manner, communications may be started. Here, explanation will be given of how the respective components in the base stations 2–5 and the mobile units 6–10 function for the communications. The channel controller 24 in each unit first assigns a slot for a traffic channel to the frame processing unit 18 and assigns a radio signal frequency to the RF unit 16. Describing the transmission from the base stations 2–5, communication data on the traffic channel as shown in FIG. 9, which has been transmitted from the mobile switching controller 1, is extracted by the interface unit 22 and formatted in a predetermined frame format by the frame processing unit 18. Then, the formatted communication data is located in the slot specified by the channel controller 24, and modulated by the modem 17 to be a modulated signal. This modulated signal is converted to a radio signal at the frequency specified by the channel controller 24 by the RF unit 16, and finally transmitted from the antenna 15.

Describing next the transmission from the mobile units 6–10 to the base stations 2–5, the radio signal representing the communication data transmitted from the mobile units 2–5 is received by the antenna 15. This radio signal is frequency-converted and amplified in the RF unit 16 under the control of the channel controller 24 to produce a modulated signal which is next demodulated in the modem 17 to be a baseband signal. The baseband signal is decomposed in the frame processing unit 18 to be communication data which is formatted in a frame as shown in FIG. 9 by the interface unit 22 and inputted to the mobile switching controller 1.

Figure 2:
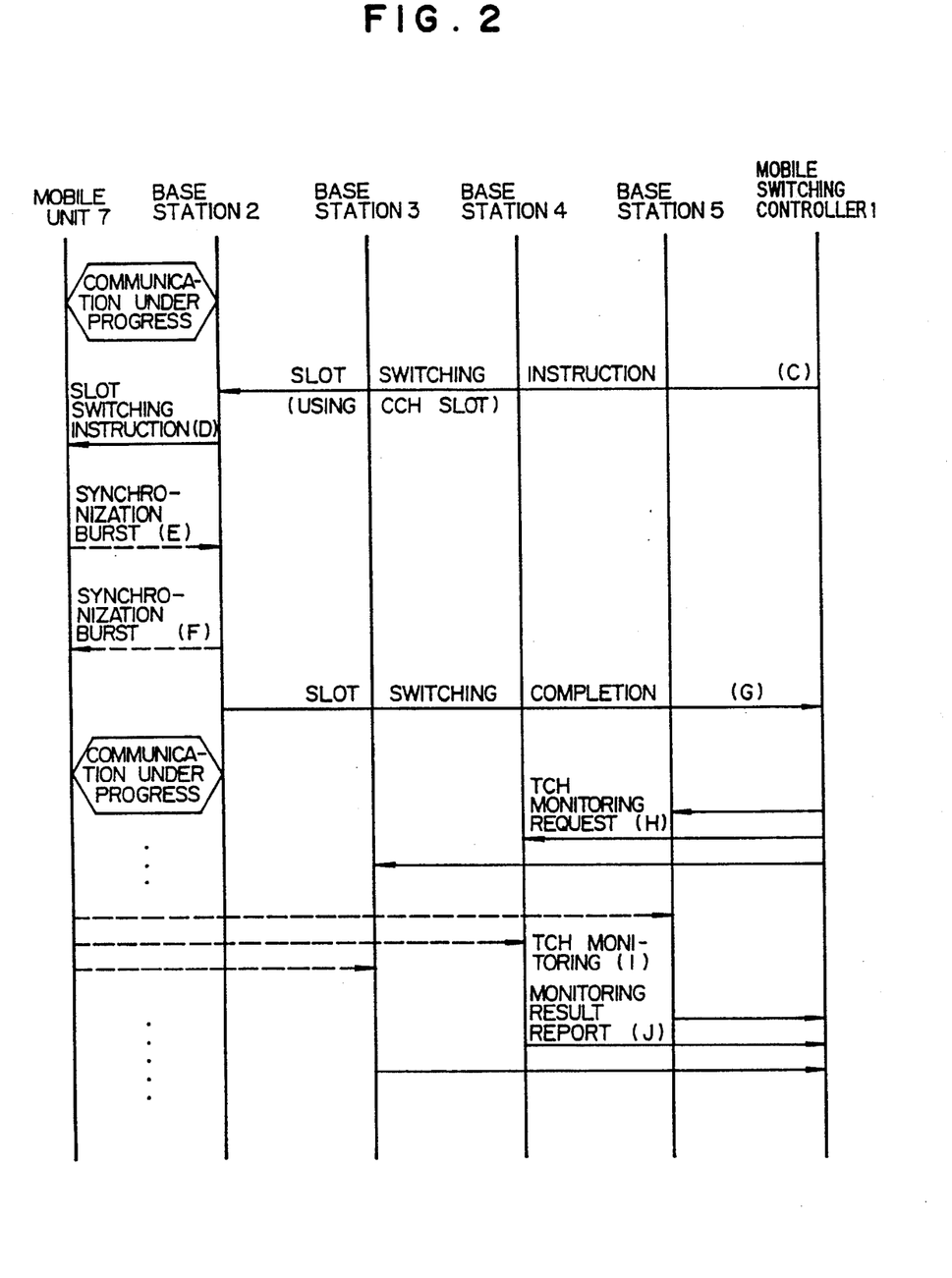
FIG. 2 is a sequence chart representing traffic channel monitoring performed by the base station of FIG. 1.

Here, traffic channel monitoring, when using the embodiment of the base station according to the present invention, will be explained below along a sequence chart shown in FIG. 2.

Figure 3A:
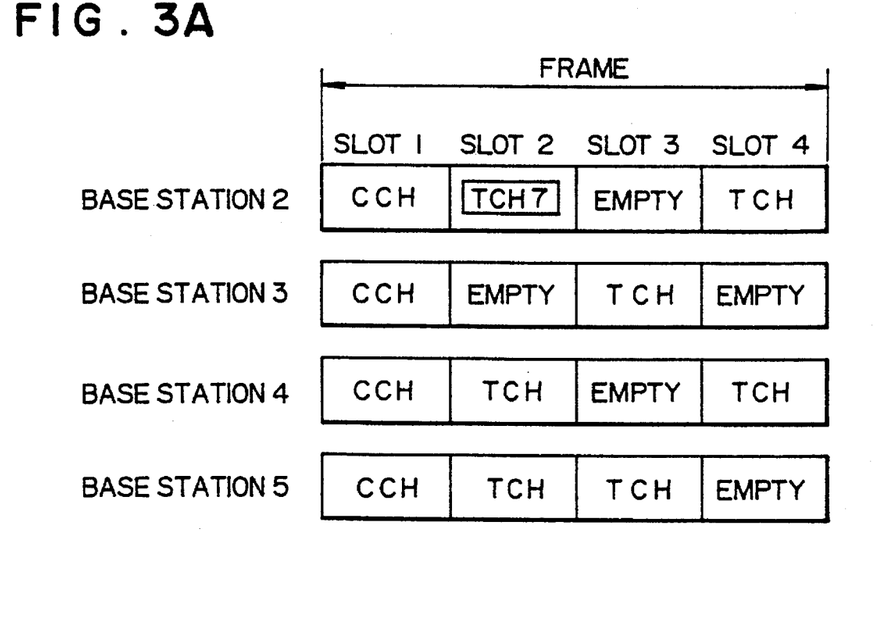
FIGS. 3A and 3B are explanatory diagrams respectively representing which slots respective base stations are using upon starting traffic channel monitoring (FIG. 3A) and during monitoring a traffic channel (FIG. 3B)

It is assumed that a mobile unit 7 is moving from a zone 11 to a zone 14 as shown in FIG. 5, and that the mobile switching controller 1 has already detected, by the fact that a received level has been lowered, that the mobile unit 7 needs zone switching. The mobile switching controller 1 has assigned control channels of the base stations 2–5 to one and the same slot as shown in FIG. 3A. The control channels are placed in slot 1 in FIG. 3A. The mobile switching controller 1 sends a slot switching instruction (C) to the base station 2. In this event, unlike the conventional zone switching operation, the mobile switching controller 1 instructs the base station 2 to cancel the control channel in slot 1 and switch slot 1 from the control channel to the traffic channel with the mobile unit 7. The slot switching instruction (C) is inputted to the channel controller 24 through the interface unit 22. The channel controller 24 uses the traffic channel to instruct the mobile unit 7 to switch the slot and to inform a destination slot, i.e., a slot to be switched. The slot switching instruction is sent to the mobile unit 7, when an audio signal is being transmitted, by using a frame of the audio signal. More specifically, in place of the audio signal, the slot switching instruction is placed in this frame and sent to the mobile unit 7. Since merely one frame of audio signal is dropped, no deterioration in sound quality will be perceived at the mobile unit 7. Thus, information on a destination slot can be transmitted while a call is going on. Each of base station 2 and the mobile unit 7, which have communicated the destination slot information, transmits a synchronization burst and tries to synchronize itself with the synchronization burst transmitted thereto. The synchronization burst is a training radio signal for the modem 17 of the base station 2 and the modem of the mobile unit 7 to correctly operate, so that no information is transmitted thereby. Also, the synchronization burst is communicated by use of a destination slot and a radio frequency assigned thereto. After the synchronization is established to enable the base station 2 and the mobile unit 7 to transmit radio signals, as a result of the communications of the synchronization bursts, the slot used to communicate the synchronization burst is switched to a normal traffic channel, thus completing the slot switching. While in this embodiment the synchronization bursts are transmitted and received between the base station 2 and the mobile unit 7, the synchronization bursts are not necessarily used for this purpose. Alternatively, normal communication data may be used for establishing the synchronization. This is because the absence of several frames of audio signals, until the synchronization is established, will not result in deteriorating the call quality. Incidentally, while the above explanation has been given of the case where the slot switching is instructed by the mobile switching controller 1, the base stations 2–5 may instruct the slot switching when radio wave interference occurs or in other unfavorable situations.

The base station 2, which has received the slot switching instruction (C), sends a slot switching instruction (D) to the mobile unit 7. Then, the base station 2 and the mobile unit 7 each transmit the synchronization burst (E) and receive the synchronization burst (F) transmitted thereto, thus completing the slot switching. Thereafter, the base station 2 informs the mobile switching controller 1 of the completion of the slot switching (G).

Figure 3B:
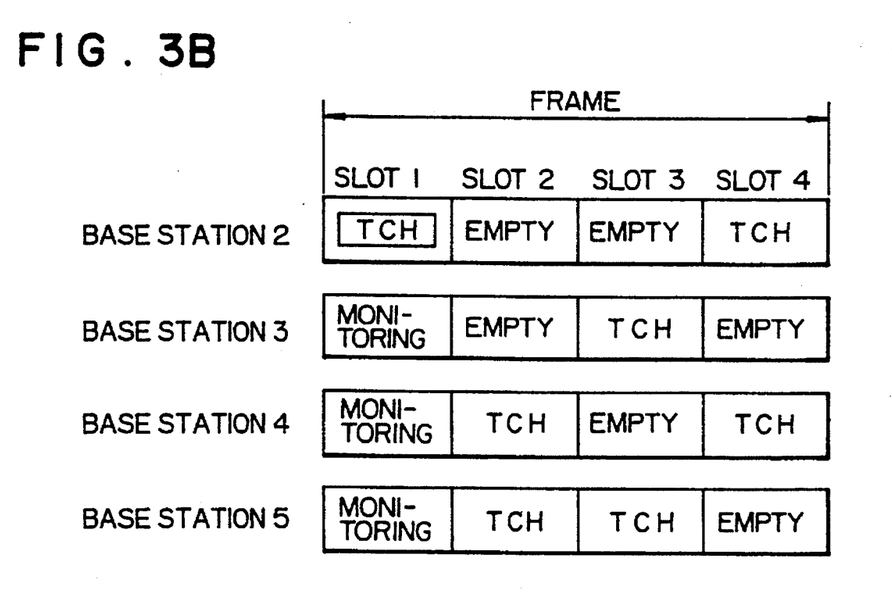

Next, for the base stations 3–5 to monitor a radio signal transmitted from the mobile unit 7, the mobile switching controller 1 sends a TCH monitoring request (H) simultaneously to the base stations 3–5. In this event, the radio frequency and slot currently used by the mobile unit 7 are informed to the base stations 3–5. The TCH monitoring request (H) is inputted to the channel controller 24 through the interface unit 22 in each of the base stations 3–5, whereby a TCH (traffic channel), through which the mobile unit 7 communicates, is monitored (I) by the channel monitor 21 under the control of the channel controller 24 in each of the base stations 3–5. FIG. 3 represents how the respective radio connection channels are using slots at the beginning of the channel monitoring (FIG. 3A) and during the channel monitoring (FIG. 3B). It is understood from FIGS. 3A and 3B that a traffic channel TCH7 to be monitored is moved from slot 2 to slot 1, and the base stations 3–5 temporarily stop receiving data through CCH, whereby the base stations 3–5 can simultaneously monitor the channel TCH7 or signals which are being transmitted from the mobile unit 7 through TCH7. The channel monitor 21 in each of the base stations 3–5 informs the channel monitoring result to the channel controller 24 which in turn sends this as a monitoring result report (J) to the mobile switching controller 1 through the interface unit 22, thus completing the channel monitoring. As will be understood from the foregoing, since the channel monitoring can be carried out simultaneously by a plurality of base stations, a shorter time is required for this purpose as compared with the conventional channel monitoring. Although the control channels are temporarily stopped, no trouble will substantially occur because they are stopped only for an extremely short period (for example, two seconds or less) and not so frequently. Therefore, this will not be perceived by a user.

Figure 4:
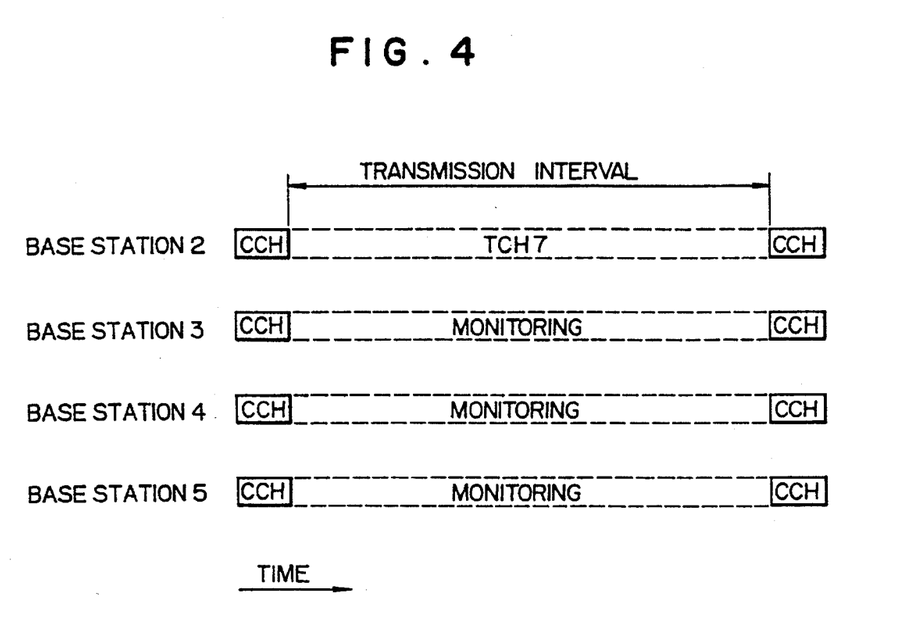
FIG. 4 is an explanatory diagram showing how control data is intermittently transmitted through a control channel while a traffic channel is being monitored.

While in the foregoing description of the embodiment, the base station 2 is prohibited from sending data through the control channel during the channel monitoring, this is not necessary if data is sent intermittently through the control channel. More specifically, by moving a traffic channel to a slot for control channels only at intervals between data transmission periods of the control channel, during which no data is sent through the control channel, the traffic channel can be monitored without stopping the transmission through the control channel. If data is intermittently transmitted through a control channel (CCH), the interval of the intermittent transmission second) such that the whole system can operate without trouble. The respective base stations 2–5 are informed by the mobile switching controller 1 of whether or not intermittent transmission is employed and of the interval, if so. The intermittent transmission is carried out by the channel controller 24 in each of the base stations 2–5 which controls the timing at which control data to be transmitted is written into the frame processing unit 18. FIG. 4 shows how the intermittent transmission is carried out. For simplicity, a slot for control channels (CCH) only is shown. Even if a traffic channel is placed in a slot for control channels only at the intermittent transmission intervals during which no control data is transmitted through the control channel, the intermittent transmission will not be interfered with, and the user will not perceive this fact. As a result, the traffic channel can be monitored substantially without any influence of stopping the control channel.

If traffic channels are hardly being used in he base stations 2–5, a traffic channel associated with a base station in a zone to which a mobile unit is to be handed over can be immediately monitored without performing the slot switching. More specifically, if it is determined that a slot used by a traffic channel under communication is empty in all of the the base stations 3–5, except for the base station 2 under communication, the mobile switching controller 1 immediately instructs the channel controllers 24 of the respective base stations 3–5 to have the channel monitors 21 carry out channel monitoring. For this purpose, the mobile switching controller 1 is provided with a memory for storing slot using situations. Thus, the slot using situations of the base stations 2–5 are sequentially stored in this memory. When the channel monitoring is to be carried out, the mobile switching controller 1 first checks the memory for confirming the slot using situations. Then, if the mobile switching controller 1 determines that a slot used by a traffic channel under communication is empty in all of the base stations 3–5 except for the currently communicating base station 2, the channel monitoring is immediately started with this slot. If this slot is also being used by any of the base stations 3–5, the traffic channel is moved to a slot for control channels so that the traffic channel is monitored through this slot for control channels. In this manner, the channel monitoring can be quickly accomplished in accordance with using situations of the slots.

As described above, the channel monitoring method according to the present invention assigns control channels of respective base stations to one and the same slot, and moves a traffic channel to be monitored to a slot for control channels in order to enable all the base stations to monitor the traffic channel in a short time. The base station of the present invention in turn comprises a channel controller which can specify a slot for control channels and switch a traffic channel to the specified slot for control channels. Control channels of he respective base stations are assigned to the same slot, and a traffic channel to be monitored is moved to the slot for the control channels, so that the traffic channel can be monitored in a short time.

I claim:

1. A channel monitoring method for use in a mobile communication system operating according to a time-division multiple access (TDMA) technique and including (i) a mobile switching controller for controlling radio channels in a plurality of radio zones, (ii) a plurality of base stations connected to said mobile switching controller by wires, each of said base stations forming one of said radio zones, and (iii) a plurality of mobile units for communicating with said plurality of base stations through said radio channels, said channel monitoring method comprising the steps of:

(a) assigning a control channel of each of said base stations to one and the same time slot in each data frame, said one and the same time slot being common to said plurality of base stations; and (b) moving a traffic channel to be monitored to said one and the same time slot and then monitoring the traffic channel.

2. A channel monitoring method according to claim 1, further comprising transmitting control data of said control channels intermittently; and wherein step (b) comprises moving said traffic channel to said one and the same time slot only at intervals during which no control data is transmitted through the control channel.

3. A channel monitoring method for use in a mobile communication system operating according to a time-division multiple access (TDMA) technique and including (i) a mobile switching controller for controlling radio channels in a plurality of radio zones, (ii) a plurality of base stations connected to said mobile switching controller by wires, each of said base stations forming one of said radio zones, and (iii) a plurality of mobile units for communicating with said base stations through said plurality of radio channels, said channel monitoring method comprising the steps of:

previously assigning a control channel of each of said base stations to a first time slot in each data frame, said first time slot being common to said plurality of base stations;

immediately monitoring a traffic channel when a second time slot, which is used by one of said plurality of base stations for a traffic channel, is not used by all the other ones of said base stations; and moving, when the second time slot is also used by any of the other ones of said base stations for a traffic channel, the traffic channel to said first time slot and then monitoring the traffic channel.

4. A base station for use in a mobile communication system operating according to a time-division multiple access (TDMA) method and including (i) a mobile switching controller for controlling radio channels in a plurality of radio zones, (ii) a plurality of base stations connected to said mobile switching controller by wires, each of said base stations forming one of said radio zones, and (iii) a plurality of mobile units for communicating with said plurality of base stations through said radio channels, said base station comprising:

a channel controller for assigning a control channel of said base station to one and the same time slot in each data frame, said one and the same time slot being common to said plurality of base stations, said channel controller being operable to specify said one and the same time slot as a time slot for monitoring a traffic channel and to move the traffic channel to said one and the same time slot; and a slot synchronization unit for establishing slot synchronization among said base station and all others of said plurality of base stations.

5. A base station in a mobile communication system operating according to a time-division multiple access (TDMA) method and including (i) a mobile switching controller for controlling radio channels in a plurality of radio zones, (ii) a plurality of base stations connected to said mobile switching controller by wires, each of said base stations forming one of said radio zones, and (iii) a plurality of mobile units for communicating with said plurality of base stations through said radio channels, said base station comprising:

a channel controller for assigning a control channel of said base station to one and the same time slot in each data frame, said one and the same time slot being common to said plurality of base stations, said channel controller being operable to (i) specify said one and the same time slot as a time slot for monitoring a traffic channel, (ii) control intermittent transmission timing of the control channel and (iii) move the traffic channel to said one and the same time slot only at intervals during which no control data are transmitted through the control channel; and a slot synchronization unit for establishing slot synchronization among said base station and all others of said plurality of base stations.

* * * * *